(12) United States Patent
Dalela et al.

(10) Patent No.: US 11,018,960 B2
(45) Date of Patent: May 25, 2021

(54) ACCELERATED TIME SERIES ANALYSIS IN A NETWORK

(71) Applicant: Cisco Technology, Inc., San Jose, CA (US)

(72) Inventors: Ashish K. Dalela, Bangalore (IN); Charles Calvin Byers, Wheaton, IL (US); Xiaoguang Jason Chen, San Jose, CA (US); Pradeep K. Munakala, Nandyal (IN)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 16/294,777

(22) Filed: Mar. 6, 2019

(65) Prior Publication Data
US 2020/0287804 A1    Sep. 10, 2020

(51) Int. Cl.
*G06F 15/173*    (2006.01)
*H04L 12/26*    (2006.01)

(52) U.S. Cl.
CPC .......... *H04L 43/026* (2013.01); *H04L 43/04* (2013.01); *H04L 43/062* (2013.01); *H04L 43/067* (2013.01); *H04L 43/087* (2013.01)

(58) Field of Classification Search
CPC ..... H04L 43/026; H04L 43/04; H04L 43/062; H04L 43/067; H04L 43/087
See application file for complete search history.

(56) References Cited

U.S. PATENT DOCUMENTS

| | | | |
|---|---|---|---|
| 6,597,660 B1 * | 7/2003 | Rueda | H04L 43/0894 370/230.1 |
| 8,656,005 B2 * | 2/2014 | Bozionek | H04L 29/06 709/224 |
| 9,875,360 B1 | 1/2018 | Grossman et al. | |
| 2002/0091495 A1 | 7/2002 | Woodroffe | |
| 2006/0212572 A1 * | 9/2006 | Afek | H04L 63/1491 709/225 |
| 2007/0171911 A1 * | 7/2007 | Ku | H04L 45/7453 370/392 |
| 2009/0254660 A1 * | 10/2009 | Hanson | H04L 12/10 709/226 |
| 2010/0106853 A1 * | 4/2010 | Kashiyama | G06Q 10/06 709/231 |

(Continued)

FOREIGN PATENT DOCUMENTS

| | | |
|---|---|---|
| WO | 2012134563 A1 | 10/2012 |
| WO | 2016057211 A1 | 4/2016 |

OTHER PUBLICATIONS

"Time Series Anomaly Detection in Network Traffic: A Use Case for Deep Neural Networks," Oct. 19, 2017, Joe Zadeh, 10 pages.

*Primary Examiner* — Razu A Miah
(74) *Attorney, Agent, or Firm* — Patterson + Sheridan, LLP (57) ABSTRACT

Techniques for accelerated Time series analysis (TSA) in a network are described. Packets from a first network flow at a network element, such as a switch or a router, are trapped using a hardware based TSA engine at the network element. The packets are then reduced into TSA tuples including TSA data points and stored into memory. A software based TSA module performs one or more TSA actions on the stored tuples, where the TSA actions produce analysis results used to determine network performance for the network and network based applications.

20 Claims, 7 Drawing Sheets

(56) References Cited

U.S. PATENT DOCUMENTS

| | | | | |
|---|---|---|---|---|
| 2010/0293535 | A1* | 11/2010 | Andrade | G06F 8/44 |
| | | | | 717/156 |
| 2011/0082910 | A1* | 4/2011 | Breslin | H04L 43/12 |
| | | | | 709/217 |
| 2011/0141894 | A1* | 6/2011 | Breslin | H04L 67/327 |
| | | | | 370/235 |
| 2011/0218978 | A1* | 9/2011 | Hong | G06F 16/2477 |
| | | | | 707/694 |
| 2012/0173710 | A1* | 7/2012 | Rodriguez | H04L 43/04 |
| | | | | 709/224 |
| 2013/0031191 | A1* | 1/2013 | Bott | H04W 12/0027 |
| | | | | 709/206 |
| 2013/0132554 | A1* | 5/2013 | Armbruster | H04J 3/0682 |
| | | | | 709/223 |
| 2014/0059216 | A1* | 2/2014 | Jerrim | H04L 67/104 |
| | | | | 709/224 |
| 2014/0156707 | A1* | 6/2014 | Sax | G06F 16/9024 |
| | | | | 707/798 |
| 2014/0325063 | A1* | 10/2014 | Shinohara | G01S 5/0027 |
| | | | | 709/224 |
| 2015/0200845 | A1* | 7/2015 | Roskind | H04L 69/22 |
| | | | | 370/241 |
| 2016/0224459 | A1* | 8/2016 | Liu | G06F 16/24568 |
| 2017/0264558 | A1* | 9/2017 | Higuchi | H04L 1/203 |
| 2018/0241641 | A1* | 8/2018 | Kelley, Jr. | H04M 7/0084 |
| 2018/0241664 | A1* | 8/2018 | Singh | H04L 63/105 |
| 2018/0246958 | A1* | 8/2018 | Serita | G06F 16/00 |
| 2018/0288081 | A1* | 10/2018 | Yermakov | H04L 41/142 |
| 2019/0379589 | A1* | 12/2019 | Ryan | G06N 3/082 |

* cited by examiner

ACCELERATED TIME SERIES ANALYSIS IN A NETWORK

TECHNICAL FIELD

Embodiments presented in this disclosure generally relate to time series analysis in a network. More specifically, embodiments disclosed herein relate to accelerated processing of network flow information in both hardware and software, for faster time series analysis, and exporting time series analysis data through Netflow packets to central network analyzers.

BACKGROUND

In many computer networks, some applications and other network functions require guarantees of determinism or specified levels of performance on the network. For example, in many real-time internet-of-thing (IoT) network applications, the connected IoT entities require network performance levels that guarantee the proper functioning of the IoT entities and associated IoT network applications. In these cases, the operation and functions of the IoT entities and the IoT network applications associated with the IoT entities require guaranteed network resources and performance.

In some examples, in order to provide a guaranteed level of network performance to the IoT entities, network management tools use Time Series Analysis (TSA) to determine the level of performance for the applications and to determine any changes that may be needed to ensure the correct operation of the network applications. TSA is currently done at network levels on aggregated data collected over long periods of time, where the aggregated data consumes large amount of bandwidth during the collection of the data. Lighter weight network performance protocols, such as Netflow, are used to aggregate network performance information such as byte counts and packet counts at a central network analysis engine in a fog server or in a cloud server for the network. However, the current lighter weight network performance protocols do not provide granular visibility into network conditions and application performance at network elements within the network, such as switches and router, or granular information regarding the routing and detailed information of the packets within application flows. Without more granular information, TSA is unavailable using Netflow, and network performance assurance cannot be guaranteed. In some examples, to maintain control over critical networks, such as IoT networks, greater visibility into the TSA related parameters is needed while also minimizing the amount of network bandwidth used to aggregate and process TSA data.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for performing time series analysis (TSA) in a network including: trapping one or more packets in a first network flow in a hardware based TSA engine on a network device; generating, at the hardware based TSA engine, a TSA tuple including a first set of TSA data points for a packet of the one or more packets; storing the TSA tuple in a memory on the network device; and performing, at a TSA software module on the network device, one or more TSA actions for the first network flow using the stored TSA tuple to generate one or more analysis results. Other embodiments of this aspect include corresponding computer systems, apparatus, and computer programs recorded on one or more computer storage devices, each configured to perform the actions of the methods.

In one embodiment a network device for performing time series analysis (TSA) in a network is described. The network device including a hardware based TSA engine and a TSA software module, where the hardware based TSA engine is configured to trap one or more packets in a first network flow. The hardware based TSA engine also generates a TSA tuple including a first set of TSA data points for a packet of the one or more packets. The hardware based TSA engine also stores the TSA tuple in a memory; and where the TSA software module is configured to: perform one or more TSA actions for the first network flow using the stored TSA tuple to generate one or more analysis results.

Example Embodiments

As described above, time series analysis (TSA) in networks is used to provide assurance that applications running in the network are executing and performing correctly. For network applications, TSA can include determining connection setup times are within a given range, determining whether connections are maintained for an expected duration, determining connection tear-down times are within a given range, determining connection requests are sent periodically with a bounded latency and jitter, determining the responses to requests are received periodically with bounded latency and jitter, determining that connected entities/devices are not sending or receiving unnecessary packets that cause problems to other deterministic flows, and/or the determining deeper fields of packets being sent or received have values in the expected ranges, determining the security status of flows, among other determinations.

Some implementations of TSA rely on delayed TSA at a central TSA server. In many cases, the data needed to perform TSA is collected from network elements and transmitted to the central TSA server over a long period of time and using large amounts of network bandwidth. The resulting delay between the central TSA and the changing conditions on the network can lead to lower performance level or responsiveness for network applications, thus conditions may occur where the applications are not performing deterministically and/or functioning properly and the network does not respond to these conditions in a timely manner.

A type of network application requiring deterministic performance includes internet of things (IoT) network applications and other networks connecting entities requiring deterministic performance such as industrial machines, smart transportation systems, grid automation and others. As the number of IoT applications and networks increases, more efficient and accelerated TSA is required to ensure that the deterministic networks perform as designed.

The systems and methods described herein provide for the implementation of TSA functions in both software (SW) and hardware (HW) and for efficiently exporting TSA information through lightweight network performance exports, such as Netflow network protocol. The HW engines described herein provide visibility into the network performance parameters at network elements including granular data calculated per port, per flow, per socket, etc. The systems and methods herein also enable low latency and real-time performance of TSA at network elements, such as routers and switches. Further, as the network performance parameters are processed by both SW and HW, the embodiments described herein also utilize Netflow to export TSA information to Netflow analyzers in higher network levels, such as to fog server or cloud based Netflow analyzers for further TSA. Once exported, this data can be absorbed by a Netflow analysis engine (a Netflow Analyzer) as well as network management software (e.g., industrial network detect (IND) and digital network architecture (DNA-C) for visualization) at a higher network level to further guarantee deterministic networking for the network applications.

Figure 1:
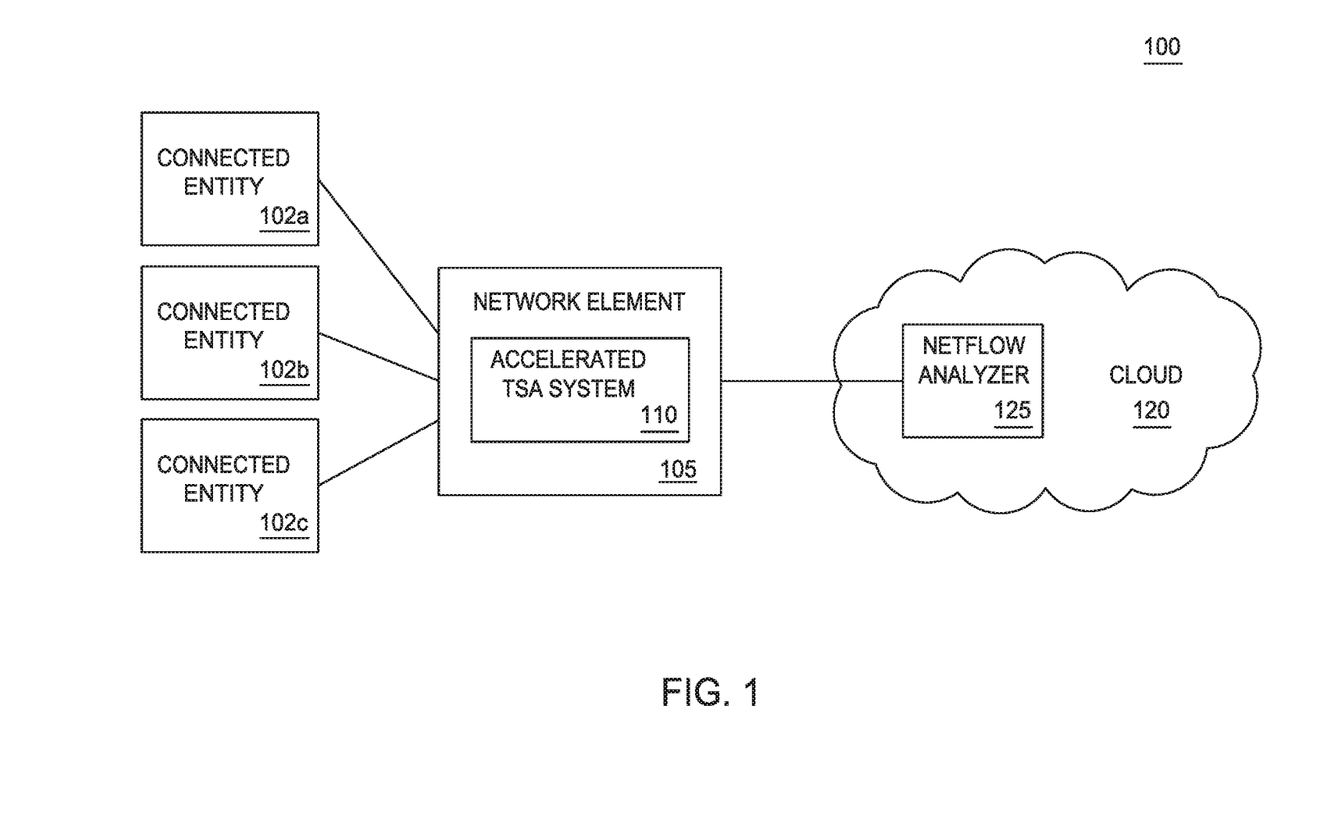
FIG. 1 illustrates a network, according to one embodiment.

FIG. 1 illustrates a network, according to one embodiment. In some examples, the network 100 includes the connected entities 102a-c. In some examples, the connected entities 102a-c include one or more network connectable devices such as personal computing devices (computers, mobile devices, etc.) performing cyclic and/or deterministic tasks. In another example, the connected entities 102a-c include one or more internet of things (IoT) network connected devices. For example, the connected entities 102a-c may include multiple smart devices such as intelligent cameras, sensors, actuators, etc. In another example, the IoT connected devices may include internet connectable industrial devices/machines that perform critical functions in an industrial setting. In these examples, the connected entities 102a-c require a deterministic network in order to perform various tasks and functions correctly. For example, intelligent cameras require guaranteed network performance in order to process and identify images within the cameras view in the required time etc. In another example, connected industrial machines may require guaranteed network performance so that the operations of the machine comply with real-time latency requirements, are properly monitored and within operating parameters.

Figure 2A:
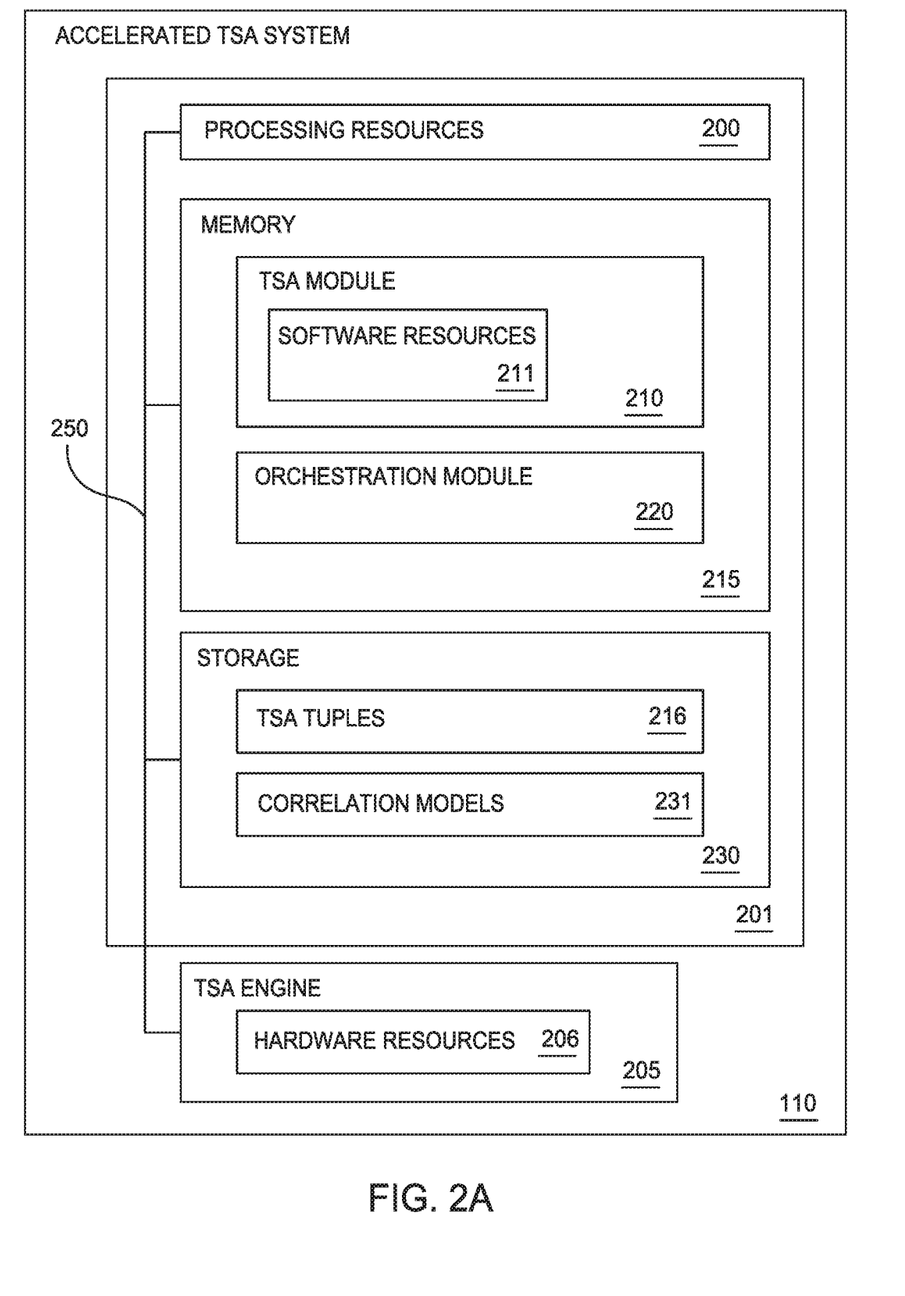
FIG. 2A illustrates an accelerated TSA system, according to one embodiment.

As shown in FIG. 1, the connected entities 102a-c are connected to a network element 105. In some examples, the network element 105 includes a network access point (AP), an IoT gateway, a router, and/or a network switch, where the network element 105 provides network access to the connected entities 102a-102c. The network element 105 includes the accelerated TSA system 110 as described in further detail in relation to FIG. 2. The accelerated TSA system 110 and the network element 105 are further connected to higher network levels in the network 100, such as a cloud network level 120. In some examples, the higher network levels may also include edge level network devices, fog level network devices, etc. The cloud network level 120 includes the Netflow analyzer 125 which provides network level analysis of the network data received from the accelerated TSA System 110, reporting of network performance, and automated response to network problems.

In some examples, the network elements and accelerated TSA system 110 aggregates high-speed data flowing from the connected entities 102a-102c, and condenses the data into lower bandwidth reports that are sent to the Netflow analyzer 125. The Netflow analyzer 125 performs detailed analytics on the reports received from the accelerated TSA system 110. For example, the Netflow analyzer 125 determines if the performance of network 100 is adequate for service level agreements, generates detailed displays on network management dashboards in real-time, and automatically reacts to emerging problems with network performance.

Figure 2B:
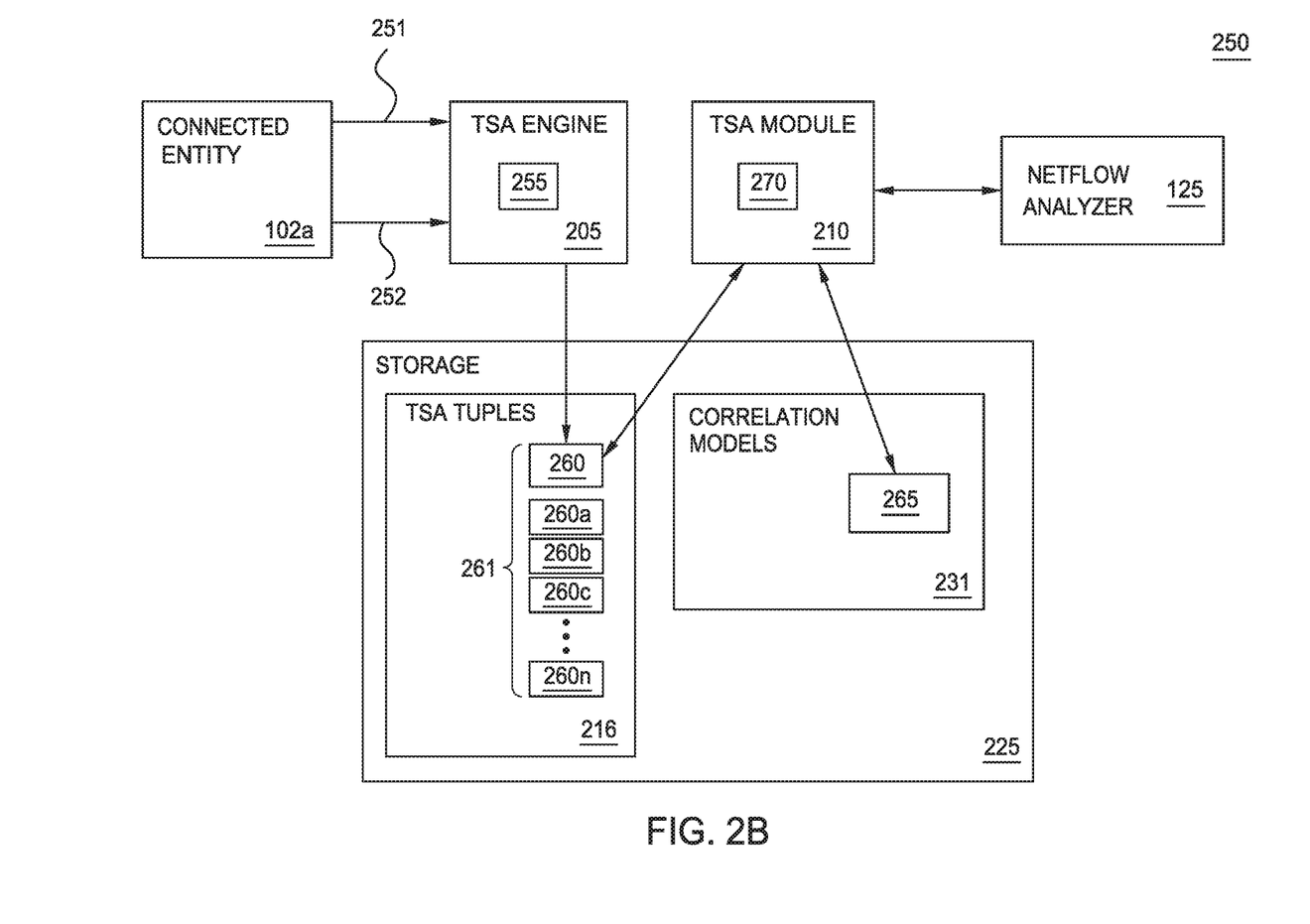
FIG. 2B illustrates a data flow through an accelerated TSA system, according to one embodiment.

FIG. 2A illustrates an accelerated TSA system 110, according to one embodiment. Reference will also be made to FIG. 2B, which illustrates a data flow through an accelerated TSA system, according to one embodiment. The accelerated TSA system 110 includes a HW TSA engine, such as TSA engine 205 and a SW system 201. The SW system 201 including processing resources 200 connected, via a BUS 250, to, a memory 215 containing a SW TSA module 210 and an Orchestration Module 220, and a storage system 230. The processing resources are also connected to the memory 215. In some examples, the hardware resources 206 are implemented as a part of a Field Programmable Gate Array (FPGA). In some examples, the hardware resources 206 perform the low-level TSA functions in digital hardware instead of software, which allows the processing of the data to keep up with multiple wirespeed flows. In some examples, elements of the SW system 201 are implemented on the same FPGA (e.g., advanced FPGAs with fast CPU cores).

In general, the HW based TSA engine 205 processes and performs pattern recognition on network data, and the SW based TSA module 210 performs data analysis such as TSA. In some examples, the accelerated TSA system 110 implements accelerated TSA at the network element 105 by trapping Transmission Control Protocol (TCP) SYN/ACK/FIN packets for TCP connections and User Datagram Protocol (UDP) open/close packets for UDP connections using the TSA engine 205, processing the packets into useable data and further processing the useable data in the SW TSA module 210. For example, as shown in FIG. 2B, the connected entity 102a has two network flows 251 and 252 associated with one or more network applications. As shown, the TSA engine 205 traps the packet 255, which is associated with the network flow 251. In some examples, the accelerated TSA system 110 timestamps the packets, including the packet 255, using a Precision Time Protocol (PTP) engine for time accuracy. In some examples, the TSA engine 205 also functions as the PTP engine. In some examples, the TSA engine is a field programmable gate array (FPGA), application-specific integrated circuit (ASIC), and/or other hardware based function performing the methods described herein. In some examples, the TSA module 210 and the Netflow analyzer 125 uses the arrival times of the trapped packets to derive a connection setup/hold-up/teardown times and message latencies as part of TSA.

In some examples, the TSA engine 205 processes the trapped packet 255 into a minimal tuple, e.g., tuple 260, for software analysis. For example, the TSA engine 205 analyzes a set of desired properties/statistics of the network (packet) flows as they pass through the network element 105 at wirespeed, and the TSA engine 205 aggregates these statistics into minimal tuples stored/sorted by network flow. For example, the tuple 260 is stored with an indication of its association with network flow 251 (and with the timestamp of the time of arrival). In some examples, the trapped packets may include protocol packets (e.g. industrial protocols packets such as Modbus, common industrial protocol (CIP), and Profinet) that are processed into a tuple. In some examples, this tuple (per packet) includes granular information about the packet such as session-id, time of arrival, protocol, packet size, packet direction, etc. In some examples, the reduction of the information into the tuple is a large reduction in the amount of data sent to software for TSA, which greatly accelerates the performance of TSA in the TSA module 210 and the Netflow analyzer 125. In some implementations, the specific packet attributes stored in tuple storage, e.g., TSA tuples 216, are programmable by link or flow ID. In some examples, this programmability can be achieved by custom programming the logic of an FGPA implementation.

The TSA engine 205 enqueues/stores the data generated and processed at the (e.g., the tuples 260-260c) into the storage system 225 as the TSA tuples 216. In some examples, the TSA engine 205, stores the information into memory using DMA over a CPU bus, such as an Advanced eXtensible Interface (AXI) bus. In some examples, the TSA tuple 216 is stored as a queue 261 which is unique per packet protocol type, and unique per network flow.

In some examples, the TSA module 210 reads the TSA tuples 216 from the storage 225 as if the tuples are normal packets (e.g. the TSA module 210 treats the tuple as if it is the packet 255 comprising all packet information), except that the amount of data to be processed is much smaller than directly reading the packets themselves due to the processing performed by the TSA engine 205. The information stored in the tuple is then further processed for TSA and formatted into Netflow exports 270, and sent across the network to the Netflow Analyzer 125. The TSA module 210 also generates and stores the correlation models 231 including a correlation model 265 in the storage 225.

In some examples, the orchestration module 220 redistributes processes performed by the TSA engine 205 and the TSA module 210 on a need basis of the TSA engine 205, TSA module 210, and the accelerated TSA system 110. The determination of which processes are shifted from the TSA engine 205 to/from the TSA module 210 is based on the performance of the engine/module and the hardware resources 206 for the TSA engine 205 and the software resources 211 for the TSA module 210. The hardware resources 206 include processor load, table space available in the HW, queue sizes, instantaneous latency requirements, gate counts in FPGAs, among other factors. In some examples, the accelerated TSA system 110 adjusts the processes executing on the TSA engine 205 and the TSA module 210 based on the current performance of the accelerated TSA system 110 and the network flows received at the network element 105. For example, the SYN/ACK timing may be trapped and stamped by the TSA module 210 instead of the TSA engine 205.

In some examples, the orchestration module 220 considers tradeoffs between the wirespeed performance of the TSA system and the complexity of the analysis it performs. For example, if complex analytics are required, but at more modest bandwidth, more TSA functionality may be moved into software resources 211. Conversely, if more wirespeed bandwidth performance or a larger number of flows needs to be processed, more TSA functions are moved to hardware resources 206.

Figure 3:
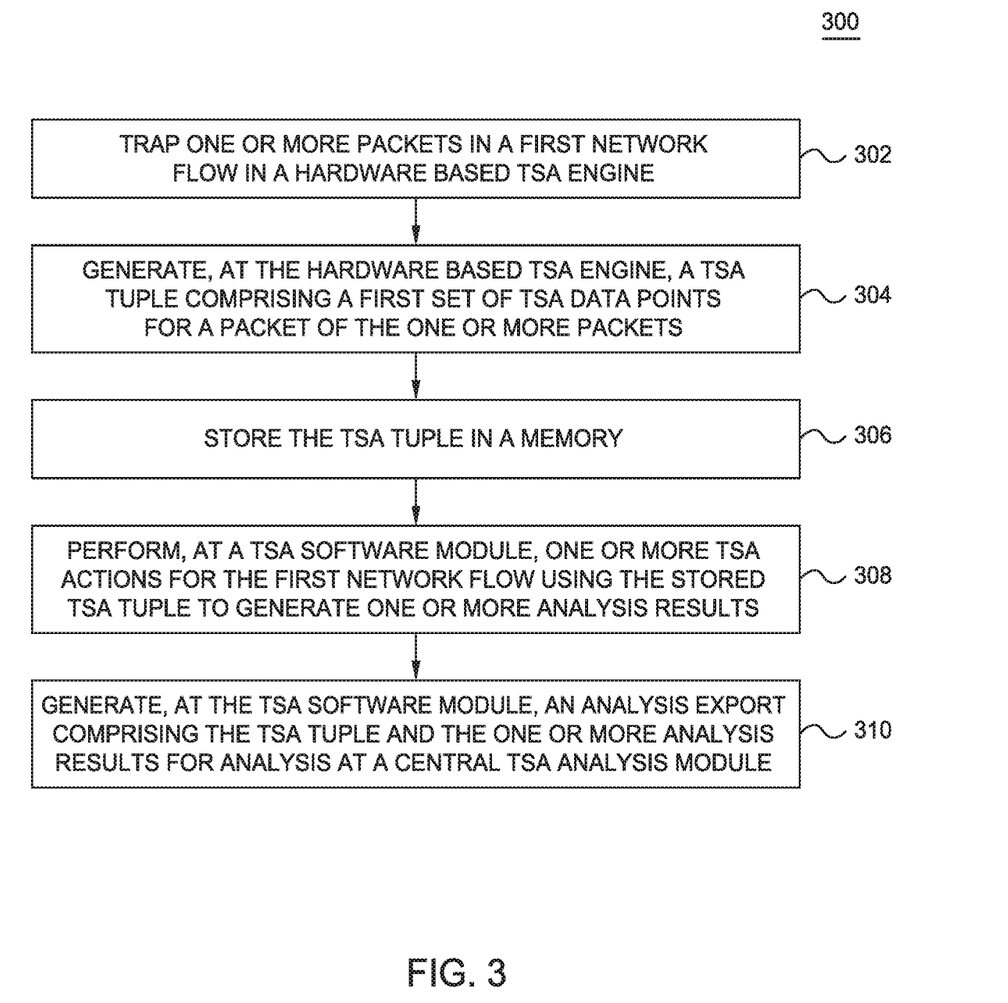
FIG. 3 is a flow chart outlining general operations for time series analysis (TSA) in a network, according to embodiments described herein.

FIG. 3 is a flow chart outlining general operations for time series analysis (TSA) in a network. Method 300 begins at block 302 where the accelerated TSA system 110, including the TSA engine 205 traps one or more packets in a first network flow in a hardware based TSA engine. For example, the accelerated TSA system 110 traps the one or more packets for the network flow 251 by copying the one or more packets (such as packet 255) into a buffer in the accelerated TSA system 110 for processing by the TSA engine 205 (and/or) the TSA module 210. For example, when the connected entities 102a-c are intelligent cameras, the accelerated TSA system 110 copies packets for an intelligent camera application network flow routed through the network element 105 in order to perform TSA.

At block 304, the TSA engine 205 generates a TSA tuple comprising a first set of TSA data points for a packet of the one or more packets. In some examples, the TSA tuple includes an identification of the network flow and other information such as the associated network application and/or connected network device(s). In some examples, the TSA engine 205 is a regular expression (REGEX) engine to generate the TSA tuple. For example, the TSA engine 205 can function as a single block of logic to identify TSA data points and store the data points as a tuple. In another example, the TSA engine may include a pipeline of successive matches in which simple matches are performed using a ternary content-addressable memory (TCAM), and complex matches are made using regular expressions. Example TCAMs include a simulated TCAM inside an FPGA and/or or external TCAM associated with the TSA engine 205.

In some examples, the TSA engine 205 generates the TSA tuple based on a configured set of TSA data points based on the type of network application and/or TSA analysis needed. In some examples, the TSA data points include session identification for the first network flow, a time of arrival, a packet protocol type, a packet size, and/or a packet direction.

In some examples, the generation of the TSA tuple at the TSA engine greatly reduces the processing resources needed by a software based TSA module to interpret the TSA parameters/data points and also reduces the amount of bandwidth needed to export the TSA information to an external and/or central TSA analyzer, such as the Netflow analyzer 125.

At block 306, the TSA engine 205 stores the TSA tuple in a memory. For example, the TSA engine 205 uses the BUS 250 to store the tuples in the TSA tuples 216. In some examples, the TSA engine 205 enqueues, such as in the queue 261, based on a packet protocol type and the first network flow, the TSA tuple into the storage 225. For example, for intelligent cameras, embodied as the connected entities 102a-c, the TSA engine 205 buffers a selected set of traffic related to a specific flow for a certain time or packet count, it is possible to have control over how many samples are aggregated into the reports sent to Netflow analyzer 125. If a small number of packets or time interval is selected, the accelerated TSA system 110 is more reactive. If a larger number is selected, the system is more bandwidth efficient, and will better filter or smooth outlying data. In some examples, the TSA system 110 enqueues the data for the intelligent cameras based on the data patterns for the cameras, such as video frames, scene changes, and/or MPEG encapsulation protocol events.

At block 308, the SW TSA module 210 performs one or more TSA actions for the first network flow using the stored TSA tuple to generate one or more analysis results. For example, the SW TSA module 210 may perform one or more the TSA actions further described in relation to FIG. 4. For example, for intelligent cameras, embodied as the connected entities 102a-c, the SW TSA module 210 may determine a latency and/or jitter for the connected entities. In an example for intelligent cameras, the SW TSA module 210 determines differences between video stream patterns associated with mostly static scenes versus those associated with fast changing scenes. In another example, for connected determinative industrial machines, the SW TSA module 210 determines changes in the flow patterns as an indication of abnormal machine states or impending failures. In some examples, networks may want to offer extra performance assurance for dynamic image flows in things like security camera networks, since those data patterns are often associated with movement in a scene. At block 310, the SW TSA module 210 generates an analysis export comprising the TSA tuple and the one or more analysis results for analysis at a central TSA analysis module, such as the Netflow analyzer 125. In some examples, the analysis export may include the TSA tuple and other data generated by the TSA actions. In other examples, the TSA module 210 may perform one or more data processing actions to further correlate and reduce the amount of data to be exported to the central TSA analysis module. The generation of the TSA tuples and the performance of the TSA actions at the network elements allow for TSA parameters and other information to be exported through Netflow, thus reducing the bandwidth needed for TSA at the Netflow analyzer in the higher network level (e.g., cloud network level 120). Further, the Netflow analyzer 125 may perform additional TSA actions and/or correlate the TSA analysis results received from the network element 105 with additional TSA analysis results received from other network elements. For example, the Netflow analyzer 125 performs detailed analytics on the reports received from the accelerated TSA system 110. For example, the Netflow analyzer 125 determines if the performance of network 100 is adequate for service level agreements, generates detailed displays on network management dashboards in real-time, and automatically reacts to emerging problems with network performance.

Figure 4:
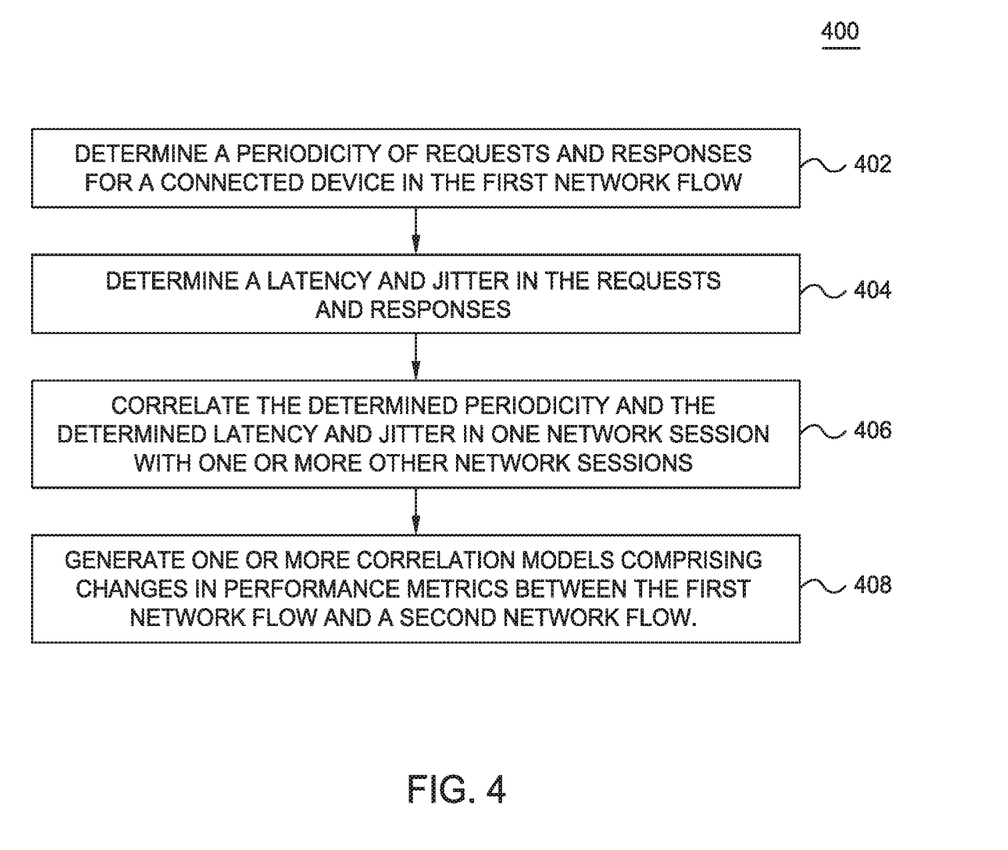
FIGS. 4 and 5 are flow charts outlining general operations for one or more TSA actions in a network, according to embodiments described herein.

FIG. 4 is a flow chart outlining general operations for one or more TSA actions in a network, according to embodiments described herein. Method 400 begins at block 402 where the TSA module 210, determines a periodicity of requests and responses for a connected device in the first network flow, such an IoT device. For example, the TSA module 210 using the TSA tuples 216 (generated by the TSA engine 205) determines the periodicity of requests and responses for a connected device. For example, the TSA module 210 determines from the TSA tuples how often a connected entity 102a, such as a camera through an associated network application, is communicating with the network element 105.

At block 404, the TSA module 210, determines a latency and jitter in the requests and responses. For example, the TSA module 210 uses the TSA tuples 216 and the determined periodicity in block 402 to determine the latency and jitter for the connection between the connected entity 102a and the network element 105. In some examples, the determined latency and jitter is stored in the storage 225 with an identification of the time and other information identifying the network flow etc.

At block 406, the TSA module 210, correlates the determined periodicity and the determined latency and jitter in one network session with one or more other network sessions. For example, the TSA module 210 may correlate the determined periodicity, latency, and jitter with one or more previously determined network sessions. For example, the TSA module 210 correlates the performance of a connected entity 102a with a previous performance of the connected entity 102a. In another example the TSA module correlates the performance of the connected entity 102a with the function of the connected entity 102b. For example, the TSA module 210 compares past records in storage 225 to determine if patterns of network access for the connected entity 102a that were established in the past are being departed from by more recent traffic. If so, this departure could indicate a problem in network 100.

At block 408, TSA module 210, generates one or more correlation models comprising changes in performance metrics between the first network flow and a second network flow. For example, the TSA module 210 using the determined correlations at block 406, generates the correlation models. The correlation models may be historical (e.g., between a current performance of the connected entity 102a and a previous performance) or may be between network flows of different connected entities (e.g., between a current performance of the connected entity 102a and the connected entity 102b).

The correlation models may be used at the TSA module 210 to determine that network performance is not meeting requirements. For example, the network application for the connected entity 102a is not performing deterministically. The network element 105 and the network 100 may then redistribute network resources in order to increase the performance of the connected entity 102a and/or the associated network application. The correlation models may also be exported and used at the Netflow analyzer 125 to determine the overall network performance of the connected entities and the associated network applications.

Figure 5:
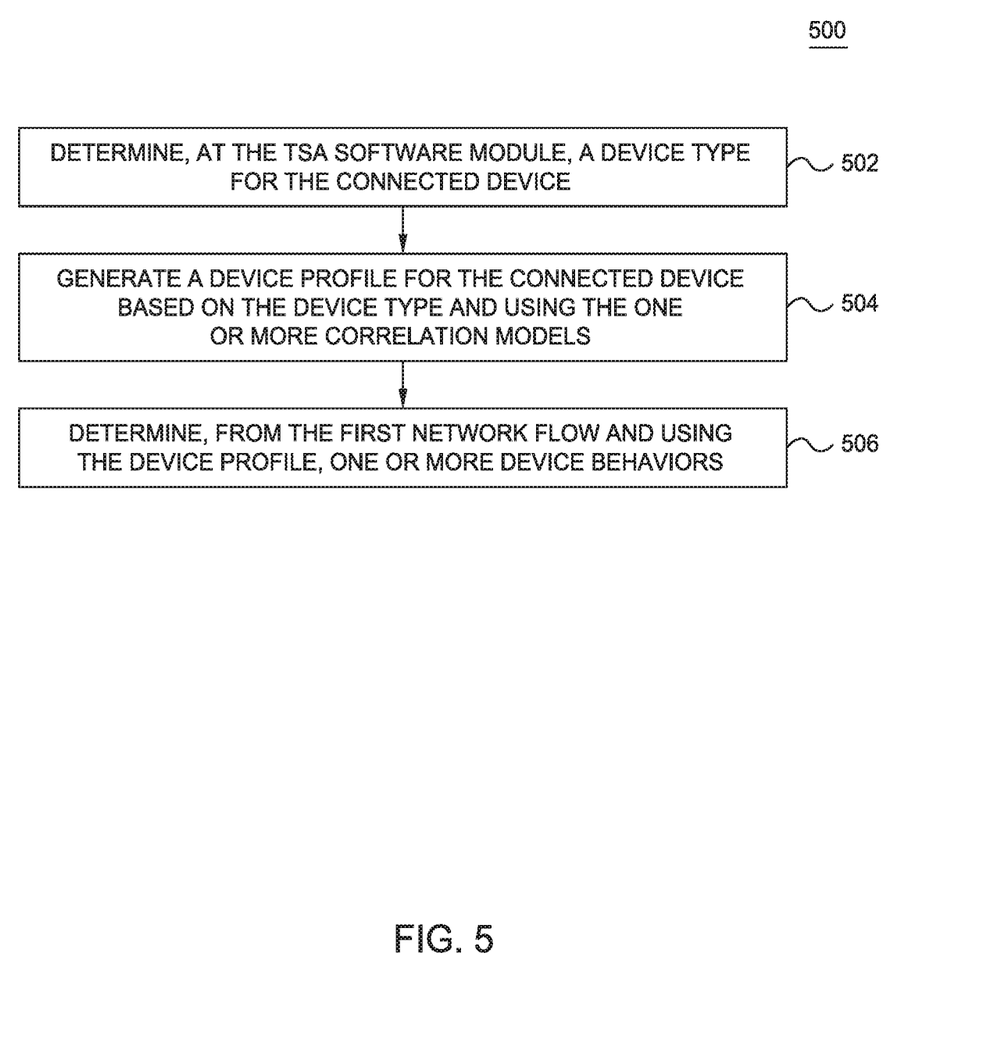

FIG. 5 is a flow chart outlining general operations for one or more TSA actions in a network, according to embodiments described herein. Method 500 begins at block 502 where the TSA module 210, determines a device type for the connected device. For example, the TSA module 210 determines from the TSA tuple that the connected device (e.g., connected entity 102a) is an IoT device (e.g., a camera). For example, the TSA module 210 may read device configuration data (for example a Manufacture Usage Description (MUD) data base entry) to determine the device type. In another example, the device type may be inferred from the device's traffic (e.g., protocol identification fields, socket numbers, Uniform Resource Locators (URLs), and internet protocol (IP) addresses to estimate the type of device).

At block 504, the TSA module 210, generates a device profile for the connected device based on the device type and using the one or more correlation models determined in block 408 of FIG. 4. For example, the TSA module 210, can generate a device profile the connected entity 102a based on its current and past performance and the performance of other connected entities that are the same device type. For example, if the connected entities 102a-102c are all cameras, the TSA module 210 generates a device profile based on the TSA of all the connected cameras.

At block 506, the TSA module 210, determines, from the first network flow and using the device profile, one or more device behaviors. For example, the TSA module 210 may determine, using the correlation modules, and the device profile, that the connected entity 102a is behaving erratically. This may be an indication that the connected entity 102a is malfunctioning and/or has been compromised (e.g., security of the device has been breached). The network element 105 may then isolate the connected entity 102a until its condition is determined. For example, for an intelligent camera, the device normally produces an identifiable traffic pattern, characterized by a predictable video bandwidth (e.g., transients as motion is viewed by the camera), all destined for a predictable set of IP addresses. If the security of that camera is compromised, (e.g., the camera is being used for a distributed-denial of service (DDoS) attack), it will have a much different bandwidth pattern to a much different set of IP addresses. The TSA module 210 determines that the different bandwidth and IP addresses are occurring and determines the camera is acting erratically and isolates/disconnects the camera(s) from the network.

Figure 6:
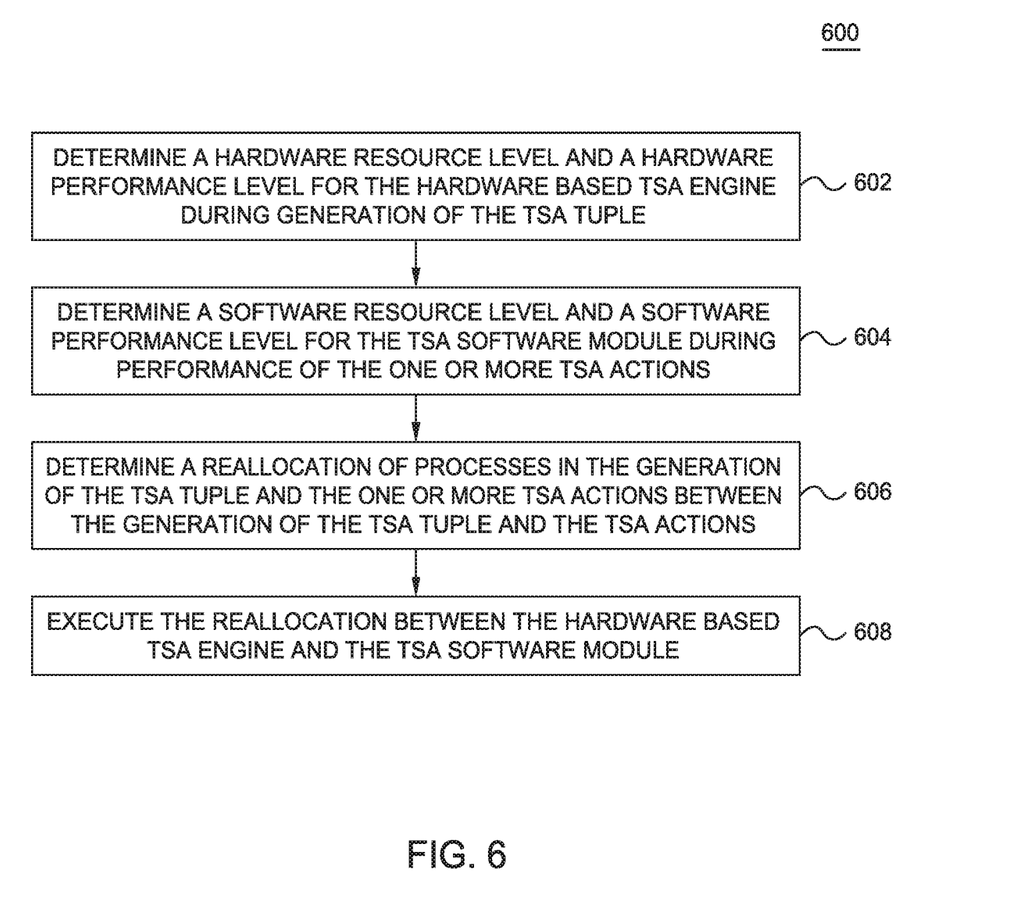
FIG. 6 is a flow chart outlining general operations for an additional TSA method in a network, according to embodiments described herein.

FIG. 6 is a flow chart outlining general operations for an additional TSA method in a network, according to embodiments described herein. Method 600 begins at block 602 where the orchestration module 220 determines a hardware resource level and a hardware performance level for the hardware based TSA engine during generation of the TSA tuple. In some examples, the hardware resource level includes one or more of FPGA gate counts, memory size, power dissipation, and bandwidth associated with storage 225. In some examples, the hardware performance level includes a determination/comparison of how close the current utilization of the hardware resources is to designated limits of the utilization for the resources.

At block 604, the orchestration module 220, determines a software resource level and a software performance level for the TSA software module during performance of the one or more TSA actions. In some examples, the software resources level includes one or more of a CPU utilization, cache context size, number of processes running, main memory footprint, bandwidth on various networks, and input/output interfaces. In some examples, the software performance level includes a determination/comparison of how close the current utilization of the software resources is to designated limits of the utilization for the resources.

At block 606, the orchestration module 220, determines a reallocation of processes in the generation of the TSA tuple and the one or more TSA actions between the generation of the TSA tuple and the TSA actions based upon the determined hardware resource level, hardware performance level, software resource level, and software performance level, where the reallocation comprises a movement of TSA tasks to or from the hardware based TSA engine to or from the TSA software module. For example, the orchestration module 220 may determine that the hardware resources 206 and the TSA engine 205 are below a performance level and the software resources 211 and the TSA module 210 are performing above a given performance level such that some tasks executed by the TSA engine 205 can be executed by the TSA module 210, which increases the overall throughput of the accelerated TSA system 110. For example, the timestamping of the TSA tuples stored in the 216 may be performed by the TSA module 210, thus the orchestration module 220 reallocates the timestamping from the TSA engine 205 to the TSA module 210. Furthermore, in some examples, the correlation functions of block 408 of FIG. 4 are partitioned mostly into hardware (where they may use large gate counts, memory utilization, or contribute to power dissipation, but will run fast); or mostly into software (where they will have higher versatility and larger data structure sizes, but may not run at wirespeed). In some examples, all of the TSA tasks and other functions of the TSA engine 205 may be executed by SW, such as the TSA module 210. For example, all of the TSA tasks may be reallocated from the TSA engine 205 to the TSA module 210.

At block 608, the orchestration module 220 executes the reallocation between the hardware based TSA engine and the TSA software module. For example, the orchestration module 220 reassigns the timestamping of the received packets at the network element 105 from the TSA engine 205 to the TSA module 210. In some examples, this reallocation involves the steps of temporarily pausing the TSA functions, reprogramming an FPGA, starting or stopping software functions, and restarting the TSA functions.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As described above, including in relation to FIG. 2, various computing components may be included to perform the methods described herein. For example, bus 250 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, TSA system 110 typically includes a variety of computer system readable media. Such media may be any available media that is accessible by accelerated TSA system 110, and it includes both volatile and non-volatile media, removable and non-removable media.

Memory 215 can include computer system readable media in the form of volatile memory, such as random access memory (RAM) and/or cache memory. TSA system 110 may further include other removable/non-removable, volatile/non-volatile computer system storage media. In some examples, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 250 by one or more data media interfaces.

As depicted and described above, memory 215 may include at least one program product having a set (e.g., at least one) of program modules that are configured to carry out the functions of embodiments of the invention. The accelerated TSA system 110 may further include other removable/non-removable volatile/non-volatile computer system storage media. In some examples, a storage system may be included as part of memory 215 and may typically provide a non-volatile memory for the networked computing devices, and may include one or more different storage elements such as Flash memory, a hard disk drive, a solid state drive, an optical storage device, and/or a magnetic storage device.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for performing time series analysis (TSA) in a network comprising:
   trapping one or more packets in a first network flow in a hardware based TSA engine on a network device;
   generating, at the hardware based TSA engine, a TSA tuple comprising a first set of TSA data points for a packet of the one or more packets;
   determining a hardware resource level and a hardware performance level for the hardware based TSA engine during generation of the TSA tuple;
   storing the TSA tuple in a memory on the network device;
   performing, at a TSA software module on the network device, one or more TSA actions for the first network flow using the stored TSA tuple to generate one or more analysis results;
   determining a software resource level and a software performance level for the TSA software module during performance of the one or more TSA actions;
   determining a reallocation of processes between the hardware based TSA engine and the TSA software module based on at least one of the hardware resource level, the hardware performance level, the software resource level, and the software performance level; and
   executing the reallocation between the hardware based TSA engine and the TSA software module.

2. The method of claim 1, further comprising:
   generating, at the TSA software module, an analysis export comprising the TSA tuple and the one or more analysis results for analysis at a central TSA analysis module.

3. The method of claim 1, wherein the one or more TSA actions comprise one or more of:
   determining a periodicity of requests and responses for a connected device in the first network flow;
   determining a latency and jitter in the requests and responses;
   correlating the determined periodicity and the determined latency and jitter in one network session with one or more other network sessions; and
   generating one or more correlation models comprising changes in performance metrics between the first network flow and a second network flow.

4. The method of claim 3, further comprising:
   determining, at the TSA software module, a device type for the connected device;
   generating a device profile for the connected device based on the device type and using the one or more correlation models; and
   determining, from the first network flow and using the device profile, one or more device behaviors.

5. The method of claim 3, wherein the connected device comprises a connected internet of things device.

6. The method of claim 1, wherein the TSA data points comprise:
   a session identification;
   a time of arrival;
   a packet protocol type;
   a packet size; and
   a packet direction.

7. The method of claim 1, wherein storing the TSA tuple in the memory comprises:
   enqueueing, based on a packet protocol type and the first network flow, the TSA tuple into the memory.

8. The method of claim 1, wherein,
   the reallocation of processes comprises a reallocation in the generation of the TSA tuple and the one or more TSA actions between the generation of the TSA tuple and the TSA actions, wherein the reallocation comprises a movement of TSA tasks to or from the hardware based TSA engine to or from the TSA software module.

9. The method of claim 8, wherein the hardware resource level comprises one or more of:
   field programmable gate array gate counts for the TSA engine,
   a memory size for the TSA engine,
   a power dissipation, and
   a bandwidth associated a storage system; and
   wherein, the hardware performance level includes a comparison of the hardware resource level to designated limits of the hardware resource level.

10. The method of claim 8, wherein the software resource level comprises one or more of:
    a CPU utilization,
    a cache context size,
    a number of processes running,
    a main memory footprint,
    a bandwidth on various networks and input/output interfaces; and
    wherein, the software performance level includes a comparison of the software resource level to designated limits of the software resource level.

11. A network device for performing time series analysis (TSA) in a network, comprising a hardware based TSA engine and a TSA software module, wherein the hardware based TSA engine is configured to
    trap one or more packets in a first network flow;
    generate, at the hardware based TSA engine, a TSA tuple comprising a first set of TSA data points for a packet of the one or more packets;
    determine a hardware resource level and a hardware performance level for the hardware based TSA engine during generation of the TSA tuple
    store the TSA tuple in a memory; and
    wherein the TSA software module is configured to:
    perform one or more TSA actions for the first network flow using the stored TSA tuple to generate one or more analysis results;
    determine a software resource level and a software performance level for the TSA software module during performance of the one or more TSA actions;
    determine a reallocation of processes between the hardware based TSA engine and the TSA software module based on at least one of the hardware resource level, the hardware performance level, the software resource level, and the software performance level; and
    execute the reallocation between the hardware based TSA engine and the TSA software module.

12. The network device of claim 11, wherein the TSA software module is further configured to:
    generate an analysis export comprising the TSA tuple and the one or more analysis results for analysis at a central TSA analysis module.

13. The network device of claim 11, wherein the one or more TSA actions comprise one or more of:
    determining a periodicity of requests and responses for a connected device in the first network flow;
    determining a latency and jitter in the requests and responses;
    correlating the determined periodicity and the determined latency and jitter in one network session with one or more other network sessions; and generating one or more correlation models comprising changes in performance metrics between the first network flow and a second network flow.

14. The network device of claim 13, wherein the TSA software module is further configured to:
determine a device type for the connected device;
generate a device profile for the connected device based on the device type and using the one or more correlation models; and
determine, from the first network flow and using the device profile, one or more device behaviors.

15. The network device of claim 13, wherein the connected device comprises a connected internet of things device.

16. The network device of claim 11, wherein the TSA data points comprise one or more of:
a session identification;
a time of arrival;
a packet protocol type;
a packet size; and
a packet direction.

17. The network device of claim 11, wherein storing the TSA tuple in the memory comprises:
enqueueing, based on a packet protocol type and the first network flow, the TSA tuple into the memory.

18. The network device of claim 11, wherein the network device further comprises an orchestration module configured to:
determine the hardware resource level and a hardware performance level for the hardware based TSA engine;
determine the software resource level and a software performance level for the TSA software module;
determine the reallocation of processes in the generation of the TSA tuple and the one or more TSA actions between the generation of the TSA tuple and the TSA actions, wherein the reallocation comprises a movement of TSA tasks to or from the hardware based TSA engine to or from the TSA software module; and
execute the reallocation between the hardware based TSA engine and the TSA software module.

19. The network device of claim 18, wherein the hardware resource level comprises one or more of:
field programmable gate array gate counts for the TSA engine,
a memory size for the TSA engine,
a power dissipation, and
a bandwidth associated a storage system; and
wherein, the hardware performance level includes a comparison of the hardware resource level to designated limits of the hardware resource level.

20. The network device of claim 18, wherein the software resource level comprises one or more of:
a CPU utilization,
a cache context size,
a number of processes running,
a main memory footprint,
a bandwidth on various networks and input/output interfaces; and
wherein, the software performance level includes a comparison of the software resource level to designated limits of the software resource level.

* * * * *

UNITED STATES PATENT AND TRADEMARK OFFICE
CERTIFICATE OF CORRECTION

PATENT NO. : 11,018,960 B2
APPLICATION NO. : 16/294777
DATED : May 25, 2021
INVENTOR(S) : Ashish K. Dalela et al.

Page 1 of 1

It is certified that error appears in the above-identified patent and that said Letters Patent is hereby corrected as shown below:

In the Specification

In Column 5, Line 35, delete "FGPA" and insert -- FPGA --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*